(12) United States Patent
Kuwashiro

(10) Patent No.: US 11,513,307 B2
(45) Date of Patent: Nov. 29, 2022

(54) PROJECTION LENS AND PROJECTION DISPLAY APPARATUS USING THE SAME

(71) Applicant: CANON KABUSHIKI KAISHA, Tokyo (JP)

(72) Inventor: Shin Kuwashiro, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 483 days.

(21) Appl. No.: 16/258,147

(22) Filed: Jan. 25, 2019

(65) Prior Publication Data

US 2019/0235197 A1    Aug. 1, 2019

(30) Foreign Application Priority Data

Jan. 29, 2018  (JP) .............................. JP2018-013036
May 25, 2018  (JP) .............................. JP2018-101007

(51) Int. Cl.
*G02B 15/14* (2006.01)
*G02B 7/04* (2021.01)
*G02B 7/02* (2021.01)
*G02B 9/64* (2006.01)
(Continued)

(52) U.S. Cl.
CPC ............... *G02B 7/04* (2013.01); *G02B 7/021* (2013.01); *G02B 9/64* (2013.01); *G02B 13/06* (2013.01); *G03B 21/142* (2013.01)

(58) Field of Classification Search
CPC ........ G02B 13/06; G02B 13/16; G02B 15/14; G02B 27/0068; G02B 7/021; G02B 7/04; G02B 9/64; G02B 7/02; G03B 21/142; G03B 21/14
See application file for complete search history.

(56) References Cited

U.S. PATENT DOCUMENTS 7,545,578 B2    6/2009   Sugita
2006/0262421 A1  11/2006  Matsumoto
2008/0239507 A1  10/2008  Sugita
(Continued)

FOREIGN PATENT DOCUMENTS

CN    1715984 A    1/2006
CN    1825153 A    8/2006
(Continued)

OTHER PUBLICATIONS

Examiner provided machine translation of Sakai, JP 2011145580 A (Year: 2011).*

*Primary Examiner* — Balram T Parbadia
(74) *Attorney, Agent, or Firm* — Canon U.S.A., Inc. IP Division

(57) ABSTRACT

A projection lens includes a plurality of lens units, and a diaphragm, wherein in a case where a lens unit that moves in an optical axis direction of the projection lens during focusing serves as a focus lens unit among the plurality of lens units, at least one lens included in a lens unit that is different from the focus lens unit among the plurality of lens units and is disposed more towards a reduction conjugate side than the diaphragm is configured to move in the optical axis direction when an amount of field curvature is adjusted to focus on a curved projection surface, and wherein when the amount of field curvature is adjusted, both the at least one lens and the focus lens unit move in the optical axis direction.

22 Claims, 14 Drawing Sheets

(51) Int. Cl.
  *G02B 13/06* (2006.01)
  *G03B 21/14* (2006.01)

(56) References Cited

U.S. PATENT DOCUMENTS

| | | | |
|---|---|---|---|
| 2009/0002842 A1 | 1/2009 | Souma | |
| 2009/0059185 A1* | 3/2009 | Hisada | G02B 17/0852 353/98 |
| 2011/0304922 A1* | 12/2011 | Ichimura | G03B 21/142 359/682 |
| 2013/0258494 A1 | 10/2013 | Saori | |
| 2013/0335831 A1* | 12/2013 | Ono | G02B 15/14 359/687 |
| 2014/0340654 A1* | 11/2014 | Kuwata | G02B 13/16 353/69 |
| 2017/0059972 A1 | 3/2017 | Ichimura | |
| 2017/0227744 A1* | 8/2017 | Sakata | G03B 21/142 |
| 2018/0284408 A1* | 10/2018 | Imaoka | G02B 27/0025 |
| 2020/0019051 A1* | 1/2020 | Uchida | G02B 13/18 |
| 2020/0249448 A1* | 8/2020 | Kubota | G02B 9/12 |

FOREIGN PATENT DOCUMENTS

| | | |
|---|---|---|
| CN | 2833634 Y | 11/2006 |
| CN | 101276048 A | 10/2008 |
| CN | 102854612 A | 1/2013 |
| EP | 2012163 A2 | 1/2009 |
| JP | 63-147126 A | 6/1988 |
| JP | 2008-242402 A | 10/2008 |
| JP | 2015-49340 A | 3/2015 |
| JP | 2016-24344 A | 2/2016 |
| JP | 2017-32927 A | 2/2017 |
| RU | 2339983 C2 | 11/2008 |
| WO | 2014088104 A1 | 6/2014 |
| WO | 2017195857 A1 | 11/2017 |
| WO | 2018008199 A1 | 1/2018 |

* cited by examiner

PROJECTION LENS AND PROJECTION DISPLAY APPARATUS USING THE SAME

BACKGROUND OF THE INVENTION

Field of the Invention

The present invention relates to a projection lens system and a projection display apparatus using the projection lens system.

Description of the Related Art

In recent years, there has been a demand for a projector capable of projecting an image without blur not only on a flat screen but also on a curved screen. In order to project an image with less blur on a flat screen and a curved screen, a projection lens needs to have a function for adjusting an amount of field curvature.

As a projection lens in which an amount of field curvature is adjustable, a projection lens discussed in Japanese Patent Application Laid-Open No. 2015-49340 is known. To correct the field curvature of the projection lens caused by temperature variation, the projection lens discussed in Japanese Patent Application Laid-Open No. 2015-49340 is configured to move a part of the lenses (correction lens) in the lens unit disposed on the liquid crystal panel side in the optical axis direction of the projection lens. While an amount of filed curvature is adjustable in the projection lens discussed in Japanese Patent Application Laid-Open No. 2015-49340, such a configuration is not for the purpose of projecting an image with less blur on the above-described curved screen.

The field curvature which occurs when the above-described correction lens moves is enlarged by a lens that is a lens among lenses disposed more towards the anterior side (enlargement conjugate side) than the correction lens and has a magnifying effect. Thus, if many lenses having a magnifying effect are disposed more towards the anterior side than the correction lens, the amount of movement of the correction lens for achieving a certain amount of field curvature decreases. This allows downsizing of the entire projection lens.

However, in the projection lens discussed in Japanese Patent Application Laid-Open No. 2015-49340, the correction lens is positioned more towards the anterior side than a diaphragm, i.e., near the center of the entire projection lens. Therefore, in comparison with a case where the correction lens is positioned more towards the posterior side (reduction conjugate side) than the diaphragm, there is a small number of lenses that have a diffusion effect and are disposed more towards the anterior side than the correction lens. This increases the amount of movement of the correction lens.

More specifically, when a user tries to project an image with less blur on a curved screen using the projection lens discussed in Japanese Patent Application Laid-Open No. 2015-49340, it is necessary to increase the amount of movement of the correction lens. This may result in an increase in the size of the entire projection lens.

SUMMARY OF THE INVENTION

The present invention is directed to providing a projection lens in which an amount of field curvature is adjustable and which has a smaller size than conventional projection lenses, and a projection display apparatus using the projection lens.

According to an aspect of the present invention, a projection lens includes a plurality of lens units, and a diaphragm, wherein the plurality of lens units are configured in such a manner that intervals between adjacent lens units change during zooming or focusing, wherein in a case where a lens unit that moves in an optical axis direction of the projection lens during the focusing serves as a focus lens unit among the plurality of lens units, at least one lens included in a lens unit that is different from the focus lens unit among the plurality of lens units and is disposed more towards a reduction conjugate side than the diaphragm is configured to move in the optical axis direction when an amount of field curvature is adjusted to focus on a curved projection surface, and wherein when the amount of field curvature is adjusted, both the at least one lens and the focus lens unit move in the optical axis direction.

Further features of the present invention will become apparent from the following description of exemplary embodiments with reference to the attached drawings.

DESCRIPTION OF THE EMBODIMENTS

Exemplary embodiments of the present invention will be described below.
(Configuration of Projection Display Apparatus)

Figure 13:
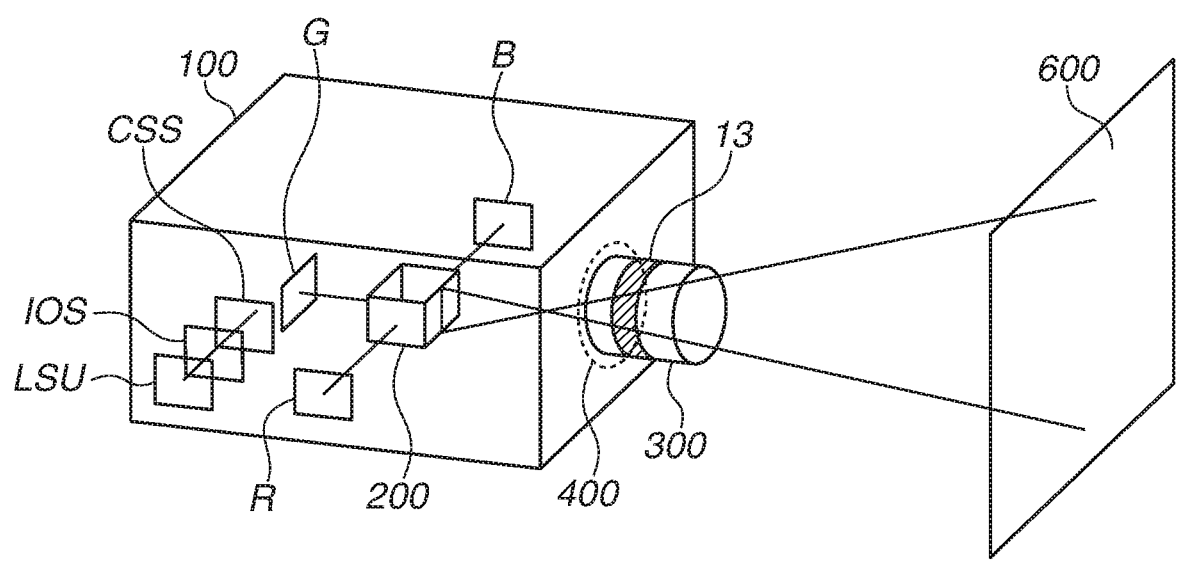
FIG. 13 is a diagram illustrating a configuration of a projection display apparatus on which the projection lens according to each exemplary embodiment is amounted.

A projector 100 (projection display apparatus) on which a projection lens 300 as an image forming optical system according to a first or a second exemplary embodiment is mounted will be described below with reference to FIG. 13. As illustrated in FIG. 13, the projector 100 includes a light source unit (LSU), an illumination optical system (IOS), a color separation system (CSS), and a color combination system 200. The projector 100 further includes a red light modulation element R, a green light modulation element G, a blue light modulation element B, and the projection lens 300. The projection lens 300 is provided with an operation unit 13 for moving a focus lens unit and a zoom lens unit (described below) in the optical axis direction of the projection lens 300.

The LSU, more specifically a high-voltage mercury lamp, can emit white light. The LSU may include laser diodes for emitting red light, green light, and blue light. The LSU may also include a laser diode for emitting blue light and a phosphor for emitting yellow light.

The white light from the LSU enters the IOS. The IOS includes an integrator optical system, a polarization conversion element, and a condenser lens unit. The integrator optical system refers to a rod integrator or two fly-eye lens arrays. The polarization conversion element can adjust the polarization direction of the white light from the LSU to a predetermined polarization direction. The condenser lens unit refers to one positive lens or a set of a plurality of lenses having positive power as a whole.

The light from the LSU is formed into light with a uniform illumination distribution by the IOS and then divided into red light, green light, and blue light by the CSS. Different color rays of light divided by the CSS enter the three light modulation elements for respective color rays of light. According to the present exemplary embodiment, while all of the red light modulation element R, the green light modulation element G, and the blue light modulation element B are transmissive liquid crystal panels, these elements may be reflective liquid crystal panels or micro mirror arrays.

Different color rays of light from the light modulation elements for respective color rays of light are combined by the color combination system 200 and then led to a screen 600 via the projection lens 300.

A housing for storing the above-described components is provided with a holding unit 400 that can hold the projection lens 300. The projection lens 300 may or may not be detachable from the holding unit 400.

The IOS, the CSS, and the color combination system 200 are collectively considered as a light guide optical system for guiding the light from the LSU to the light modulation elements and guiding the light from the light modulation elements to the projection lens 300.

The projection lens 300 according to the first exemplary embodiment will be described below with reference to FIGS. 1 to 6.
(Overall Configuration of Projection Lens)

Figure 1:
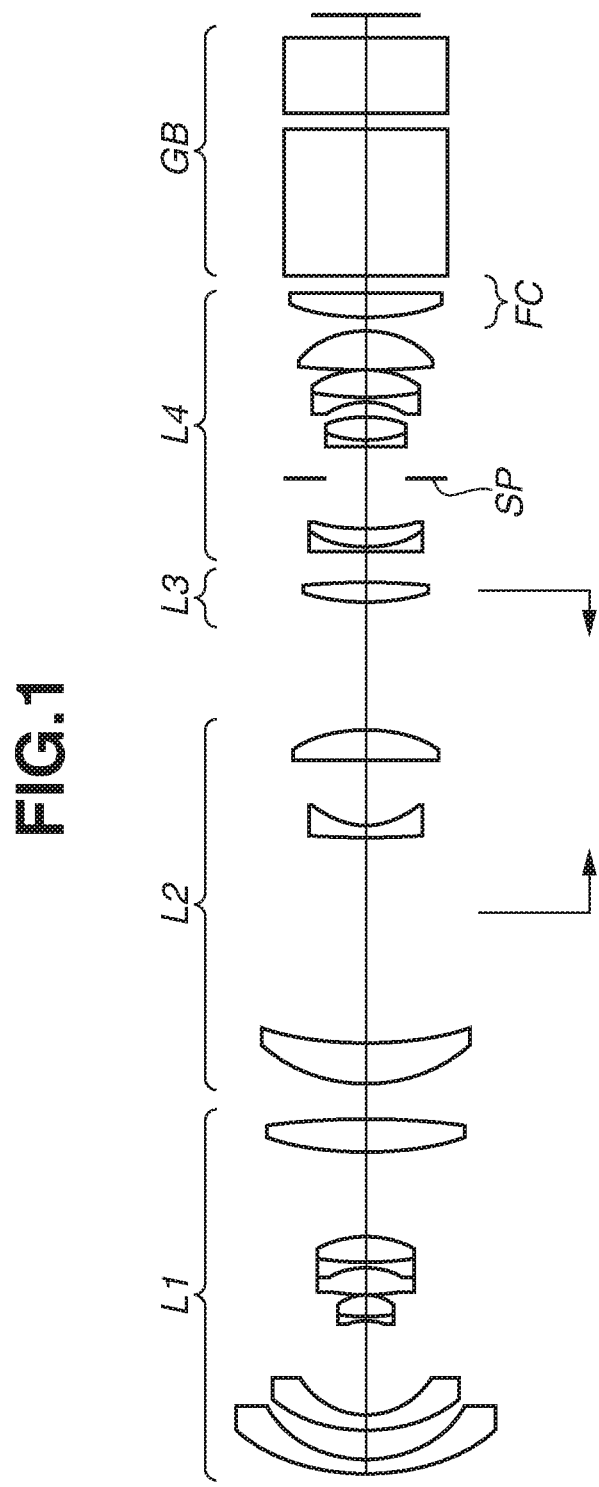
FIG. 1 is a cross-sectional view illustrating a projection lens according to a first exemplary embodiment.
Figure 7:
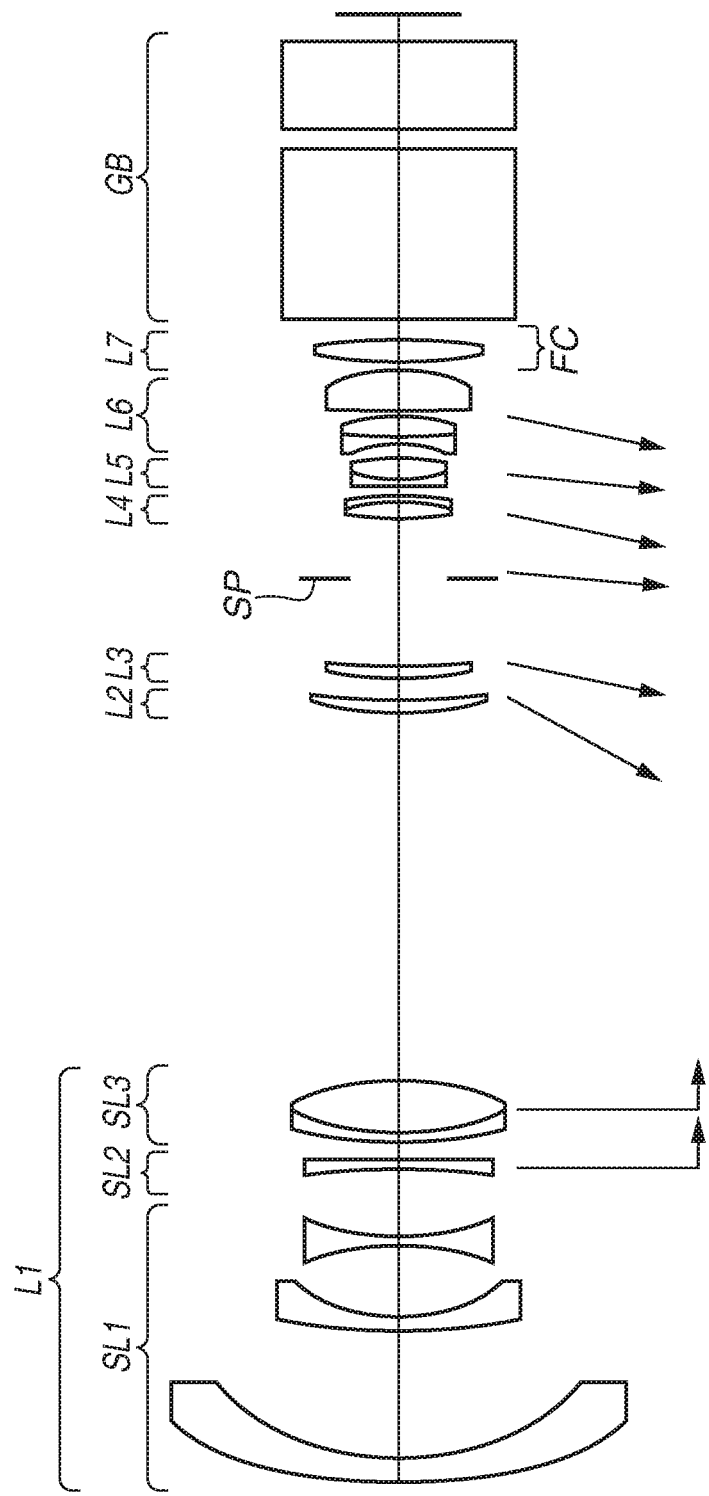
FIG. 7 is a cross-sectional view illustrating a projection lens according to a second exemplary embodiment.

FIG. 1 illustrates a lens configuration of a projection lens according to the present exemplary embodiment. Referring to FIG. 1 and FIG. 7 (described below), the left-hand side of paper is the enlargement conjugate side, and the right-hand side of paper is the reduction conjugate side.

In the projection lens according to the present exemplary embodiment which is a fixed focal length projection lens not performing zooming, a second lens unit L2 and a third lens unit L3 illustrated in FIG. 1 move in the optical axis direction of the projection lens in focusing. More specifically, in focusing from infinity to a close distance, the projection lens performs floating focusing in which the second lens unit L2 and the third lens unit L3 move toward the reduction and the enlargement conjugate sides, respectively, in the optical axis direction of the projection lens along loci different from each other. This floating focusing enables preferably correcting the field curvature caused by a change in a projection distance.

A first lens unit L1 and a fourth lens unit L4 do not move for focusing. As described above, the second lens unit L2 and the third lens unit L3 are focus lens units which move in the optical axis direction in focusing.

As described above, the projection lens according to the present exemplary embodiment includes the first lens unit L1 to the fourth lens unit L4 as a plurality of lens units configured in such a manner that the intervals between adjacent lens units change in focusing. The change in intervals between adjacent lens units does not only mean that both of adjacent lens units move in the optical axis direction. Since the intervals between adjacent lens units need only to be changed, the above-described expression includes a configuration in which either one of the lens units does not move and the other is movable, like the first lens unit L1 and the second lens unit L2. Boundaries between a plurality of lens units can be defined as the intervals between the lenses which change in focusing.

A lens unit includes one lens, one pair lens, and a set of a plurality of lenses. A pair lens refers to a cemented lens, i.e., a pair of two lenses in marginal contact with each other.
(Configuration of Each Lens Unit)

The first lens unit L1 includes eight lenses. In the projection lens according to the present exemplary embodiment, the lens disposed on the most enlargement conjugate side is a spherical lens, and the second lens from the most enlargement conjugate side is an aspherical lens. The lens disposed on the most enlargement conjugate side has a large outer diameter. Forming an aspherical lens having a large outer diameter increases manufacturing difficulty and manufacturing cost.

According to the present exemplary embodiment, by using an aspherical lens as the second lens from the most enlargement conjugate side, the manufacturing difficulty and manufacturing cost are reduced while the field curvature and distortion are corrected. The third and the fourth lenses from the enlargement conjugate side form a cemented lens. The fifth, the sixth, and the seventh lenses from the enlargement conjugate side form a cemented lens. This configuration preferably corrects the axial chromatic aberration.

The second lens unit L2 includes three lenses. The second and third lenses from the enlargement conjugate side are aspherical lenses. This configuration preferably corrects the field curvature. The projection lens according to the present exemplary embodiment is configured in such a manner the intermediate image forming point is positioned between the first and the second lenses of the second lens unit L2. This configuration achieves both a wide viewing angle and a small front lens diameter.

The third lens unit L3 includes one lens.

The fourth lens unit L4 includes eight lenses. The axial chromatic aberration is preferably corrected by forming a cemented lens with the first and the second lenses, a cemented lens with the third and the fourth lenses, and a cemented lens with the fifth and the sixth lenses, from the enlargement conjugate side. The fourth lens unit include a diaphragm SP and a field curvature adjustment lens unit FC disposed on the reduction conjugate side with respect to the diaphragm SP. A member GB illustrated in FIG. 1 and FIG. 7 (described below) includes, for example, a prism disposed between the light modulation elements and the projection lens.

(Configuration for Adjusting Amount of Field Curvature)

A description will be given of a configuration in which a negative lens disposed on the most enlargement conjugate side is moved in the optical axis direction, as a configuration for adjusting the amount of field curvature. The configuration is different from the present exemplary embodiment. In a projection lens having a wide viewing angle (wide-angle lens), a negative lens having a high refracting power is disposed on the most enlargement conjugate side or at a position near the enlargement conjugate side. Disposing a negative lens on the most enlargement conjugate side makes it easier to achieve both a wide viewing angle and a small front lens diameter than in a case where a positive lens is disposed on the most enlargement conjugate side.

When the position of a negative lens disposed on the most enlargement conjugate side changes in the optical axis direction, the position through which an off-axis ray passes changes on the lens surface of the negative lens, and accordingly the amount of field curvature also changes. More specifically, by moving the negative lens disposed on the most enlargement conjugate side or a negative lens near the enlargement conjugate side in the optical axis direction, the amount of field curvature can be adjusted, whereby an image with less blur can be projected on a curved screen.

An off-axis ray passing through the negative lens disposed on the most enlargement conjugate side has a large angle and a large ray light height with respect to the optical axis, and therefore provides a large effect of correcting the field curvature by using the negative lens. In other words, it is possible to reduce the amount of movement of the negative lens for adjusting the field curvature by a predetermined amount in the optical axis direction.

However, the increase in viewing angle increases the negative power of the negative lens on the most enlargement conjugate side or a negative lens near the enlargement conjugate side. With the increase in the negative power, the amount of occurrence of the high order aberration of the field curvature increases, and the nonlinear characteristics of the amount of occurrence of the field curvature with respect to the image height become more remarkable when the negative lens is moved in the optical axis direction. As a result, the amount of occurrence of the field curvature of light with a large image height excessively increases, making it difficult to adjust the amount of field curvature by moving the negative lens disposed on the most enlargement conjugate side in the optical axis direction. More specifically, it becomes difficult to project an image with less blur on a curved screen.

Further, since both the amount of occurrence of the field curvature and the astigmatism excessively increase, it becomes difficult to focus on the entire curved screen. In addition, since the increase in viewing angle increases the diameter of the negative lens disposed on the most enlargement conjugate side, the size of the entire image forming optical system is increased.

With the projection lens according to the present exemplary embodiment and the second exemplary embodiment (described below), the amount of field curvature is adjusted by moving a lens different from the negative lens disposed on the most enlargement conjugate side in the optical axis direction. More specifically, with the projection lens according to the present exemplary embodiment and the second exemplary embodiment (described below), the amount of field curvature is adjusted by moving the positive lens disposed on the most reduction conjugate side in the optical axis direction to change the back focus.

One of reasons why the above-described configuration of the projection lens according to the present exemplary embodiment and the second exemplary embodiment (described below) is employed is that the amount of field curvature changes when the back focus changes.

As a feature of a wide-angle lens, there is a tendency that a large amount of field curvature occurs when the back focus is shifted from the design value by the influence of a manufacture error. If an image is projected on a flat screen with the back focus shifted from the design value, a shift occurs between the position of an image display element (light modulation element) and the image forming position of the lens. In other words, the field curvature occurs when the back focus changes. As a result, even if each focus lens unit focuses an image on the center of the screen, the peripheral portion becomes out of focus. According to the present exemplary embodiment and the second exemplary embodiment (described below), the field curvature adjustment is performed by changing the back focus of the projection lens by using this feature. This makes it possible, when an image is projected on a curved screen, to project an image which is in-focus on the entire screen.

A description will be given of the reason why the amount of field curvature changes when the back focus changes. When the back focus changes, the position where the light from the light modulation element enters the lens surface of the positive lens disposed on the most reduction conjugate side changes. According to the present exemplary embodiment, the position of the image display element with respect to the projection lens in the optical axis direction is fixed. If the incident position on the lens surface of the positive lens disposed on the most reduction conjugate side changes, the incident position on the lens surface of the lens more towards the enlargement conjugate side than the positive lens also changes. Consequently, the incident position on the lens surface of the negative lens disposed on the most enlargement conjugate side changes.

Before the back focus changes, the outmost off-axis ray has been entered the position X where the field curvature of the amount A is generated on the lens surface of the negative lens disposed on the most enlargement conjugate side. In this case, when the back focus changes, the outmost off-axis ray does not enter the position X but enters the position Y where the field curvature of the amount B is generated. More specifically, as described above, the amount of field curvature can be adjusted by adjusting the back focus.

(Reason why Image Forming Optical System Smaller than Conventional Systems can be Achieved)

The amount of field curvature can also be adjusted by changing the back focus in such a manner that a lens other than the positive lens disposed on the most reduction conjugate side is moved in the optical axis direction.

A description will be given of a configuration in which the amount of field curvature can be adjusted by adjusting the back focus in such a manner that a lens with high sensitivity to the back focus is moved in the optical axis direction. With this configuration, the back focus can be changed by a desired amount by moving the lens a small amount in the optical axis direction and the amount of field curvature can also be adjusted by a desired. This configuration enables achieving an image forming optical system which is capable of adjusting the amount of field curvature and is smaller than conventional systems.

Generally, among the lenses disposed on the reduction conjugate side with respect to the diaphragm, the lens disposed on the most reduction conjugate side tends to reveal the highest sensitivity to the back focus. Thus, to achieve a small projection lens, it is desirable to adjust the amount of field curvature by moving the lens disposed on the most reduction conjugate side in the optical axis direction. Alternatively, the amount of field curvature may be adjusted by moving a different lens in the optical axis direction.

More specifically, the lens unit disposed at the most reduction conjugate side from among the plurality of lens units (the first lens unit L1 to the fourth lens unit L4) is referred to as the final lens unit, and according to the present exemplary embodiment, the fourth lens unit L4 corresponds to the final lens unit. The field curvature adjustment lens unit FC as at least one lens included in the final lens unit and disposed on the reduction conjugate side with respect to the diaphragm needs to move in the optical axis direction when the amount of field curvature is adjusted.

According to the present exemplary embodiment, while the field curvature adjustment lens unit FC is a positive lens disposed on the most reduction conjugate side, the configuration of the field curvature adjustment lens unit FC is not limited thereto. Alternatively, for example, the positive lens disposed on the reduction conjugate side and the lens adjacent to the positive lens may be integrally moved in the optical axis direction to adjust the amount of field curvature. The amount of field curvature may be adjusted by moving, in the optical axis direction, only the lens adjacent to the positive lens disposed on the most reduction conjugate side. More specifically, the field curvature adjustment lens unit FC may include at least either one of the lens disposed on the most reduction conjugate side and the lens adjacent to this lens.

The field curvature adjustment lens unit FC needs to be at least one lens described below. More specifically, the field curvature adjustment lens unit FC is at least one of a plurality of lenses that is included in a lens unit different from the focus lens units, from among the plurality of lens units included in the image forming optical system, and is disposed on the reduction conjugate side with respect to the diaphragm. At least the one lens needs to move in the optical axis direction of the image forming optical system during field curvature adjustment. More specifically, the field curvature adjustment lens unit FC may be a lens equivalent to the at least one of a plurality of lenses included in a lens unit other than the final lens unit. According to each exemplary embodiment, the field curvature adjustment lens unit FC may be replaced with the at least one lens. The field curvature adjustment lens unit FC may be referred to as a field curvature adjustment unit FC.

The closer the field curvature adjustment lens unit FC is to the reduction conjugate side, the larger the number of lenses having an effect of magnifying the field curvature which occurs when the field curvature adjustment lens unit FC moves in the optical axis direction. The larger the number of lenses having this magnifying effect, the less the amount of field curvature which occurs in the field curvature adjustment lens unit FC, and the less the amount of movement of the field curvature adjustment lens unit FC in the optical axis direction. As a result, the size of the entire image forming optical system can be reduced. Thus, as described above, it is desirable that the field curvature adjustment lens unit FC includes at least either one of the lens disposed on the most reduction conjugate side and the lens adjacent to this lens.

(More Desirable Configuration)

A more desirable configuration according to the present exemplary embodiment and the second exemplary embodiment will be described below.

According to the present exemplary embodiment, moving the field curvature adjustment lens unit FC in the optical axis direction shifts the focus near the optical axis. The field curvature adjustment lens unit FC and the focus lens units are thus simultaneously moved during field curvature adjustment. As described above, according to the present exemplary embodiment, the second lens unit L2 and the third lens unit L3 are focus lens units. With this configuration, the amount of field curvature can be adjusted while focus variation near the optical axis is reduced.

In field curvature adjustment, the field curvature adjustment lens unit FC and the focus lens units may be alternately moved in the optical axis direction instead of being simultaneously moved. In this case, it is desirable to alternately move the lens units by a minute amount. With such a configuration, the amount of focus variation near the optical axis which occurs when the field curvature adjustment lens unit FC and the focus lens units move in the optical axis direction becomes small enough with respect to the depth of field of the projection lens. By moving these lens units in this way, the amount of field curvature can be adjusted while focus variation near the optical axis is reduced to such an extent that the focus change is negligible within the view range.

It is desirable that the projection lens satisfies the following conditional formula (1):

$$4.0 \leq fc/f \leq 10.0 \quad (1)$$

when the field curvature adjustment lens unit FC has a focal length fc and the entire projection lens system has a focal length f.

Although the projection lens according to the present exemplary embodiment is a fixed focal length lens, the projection lens according to the second exemplary embodiment (described below) is a zoom lens. In a case where the projection lens is a zoom lens, the focal length f of the entire projection lens system in the conditional formula (1) is replaced with a focal length fw of the entire projection lens system at the wide-angle end.

The conditional formula (1) defines the focal length of the field curvature adjustment lens unit FC. If the focal length of the field curvature adjustment lens unit FC is too short and exceeds the lower limit of the conditional formula (1), i.e., if the power of the field curvature adjustment lens unit FC is too high, focus variation near the optical axis excessively increases during field curvature adjustment. As a result, the amount of movement of the focus lens units for focus correction excessively increases. This causes the total lens length of the projection lens to extend, which is not desirable. Further, the sensitivity of the field curvature adjustment excessively increases. This degrades the adjustment accuracy, which is not desirable.

If the focal length of the field curvature adjustment lens unit FC excessively increases and exceeds the upper limit of the conditional formula (1), i.e., if the power of the field curvature adjustment lens unit FC is too low, the amount of movement for the field curvature adjustment increases. This causes the total lens length of the projection lens to be extended, which is not desirable.

It is more desirable that the projection lens satisfies the following conditional formula (1a):

$$4.5 \leq fc/f \leq 9.6. \quad (1a)$$

When the field curvature adjustment lens unit FC has a focal length fc and the focus lens units have a focal length ff, it is desirable that the projection lens satisfies the following conditional formula (2):

$$1.0 \leq |ff/fc| \leq 12.0. \quad (2)$$

When two or more lens units are focus lens units as in the present exemplary embodiment, the focal length ff of the focus lens units represented by the conditional formula (2) is used as a combined focal length of the plurality of lens units. According to the present exemplary embodiment and the second exemplary embodiment (described below), the focal length ff of the focus lens units indicates the focal length when focusing is performed in a state where a 70-inch projection image is projected on the screen. More specifically, according to the present exemplary embodiment, the focal length ff indicates the focal length of the focus lens units when focusing is performed in a state where a screen and a projector are arranged in such a manner that the projection image is at 70 inches in size. According to the second exemplary embodiment (described below), the focal length ff indicates the focal length of the focus lens units when focusing is performed in a state where wide-angle end zooming is set, and a screen and a projector are disposed in such a manner that the projection image is at 70 inches in size.

The conditional formula (2) defines the balance between the focal length of the field curvature adjustment lens unit FC and the focal length of the focus lens units. If the focal length ff of the focus lens units is too short and exceeds the lower limit of the conditional formula (2), i.e., if the power of the focus lens unit is too high, the sensitivity of regular focusing excessively increases. As a result, the accuracy of regular focusing will be degraded, which is not desirable. Further, the sensitivity of out-of-focus correction near the optical axis during field curvature adjustment also excessively increases. This degrades the accuracy of the out-of-focus correction, which is not desirable. If the focal length of the field curvature adjustment lens unit FC is too long and exceeds the lower limit of the conditional formula (2), i.e., if the power of the field curvature adjustment lens unit FC is too low, the amount of movement for the field curvature adjustment increases, as described above.

If the focal length ff of the focus lens unit is too long and exceeds the upper limit of the conditional formula (2), i.e., if the power of the focus lens unit is too low, the amount of movement of the focus lens units during regular focusing increases. As a result, the total lens length of the projection lens is extended, which is not desirable. Further, the amount of movement of the focus lens units when an out-of-focus state near the optical axis is corrected during field curvature adjustment also increases. As a result, the total lens length of the projection lens is extended, which is not desirable. If the focal length of the field curvature adjustment lens unit FC is too short and exceeds the upper limit of the conditional formula (2), i.e., if the power of the field curvature adjustment lens unit FC is too high, focus variation near the optical axis excessively increases during field curvature adjustment, as described above.

It is more desirable that the projection lens satisfies the following conditional formula (2a):

$$1.3 \leq |ff/fc| \leq 10.0. \quad (2a)$$

It is desirable that the field curvature adjustment lens unit FC is one lens or one pair lens. Configuring the field curvature adjustment lens unit FC in this way enables simplifying the structure of a lens barrel for moving the field curvature adjustment lens unit FC in the optical axis direction and saving the weight of the lens barrel. As a result, it becomes possible to use a small-sized motor having a small driving force as a motor for moving the field curvature adjustment lens unit FC in the optical axis direction. This enables reducing the size of mechanical structures around the projection lens, thus reducing the size of the entire projector. The above-described pair lens refers to a cemented lens composed of a plurality of lenses and to a plurality of lenses in marginal contact with each other. It is desirable that the field curvature adjustment lens unit FC is one lens or one pair lens disposed on the most reduction conjugate side from among the plurality of lenses included in the projection lens. This configuration enables reducing the size of the projection lens, as described above.

According to the present exemplary embodiment and the second exemplary embodiment (described below), it is desirable that the field curvature adjustment lens unit FC has positive power. Configuring the field curvature adjustment lens unit FC in this way enables reducing the size of the final lens unit.

The projection lens according to the present exemplary embodiment is an intermediate image forming (re-image forming) projection lens. More specifically, the projection lens according to the present exemplary embodiment is configured in such a manner that the enlargement conjugate surface and the intermediate image forming surface disposed inside the projection lens are conjugated, and the intermediate image forming surface and the reduction conjugate surface are conjugated.

In a projection lens for a projector using a reflective liquid crystal panel or a micro mirror array as an image display element, a long back focus is required to dispose a prism between the projection lens and the image display element. In a projection lens of non-intermediate image forming type, achieving both a long back focus and a wide viewing angle requires a large diameter of the lens on the most enlargement conjugate side (a large front lens diameter). However, in a projection lens of intermediate image forming type including an optical system with a short back focus to the intermediate image forming point and a relay optical system with a long back focus from the intermediate image forming point to the secondary image forming point, both a small front lens diameter and a wide viewing angle can be achieved.

Figure 2:
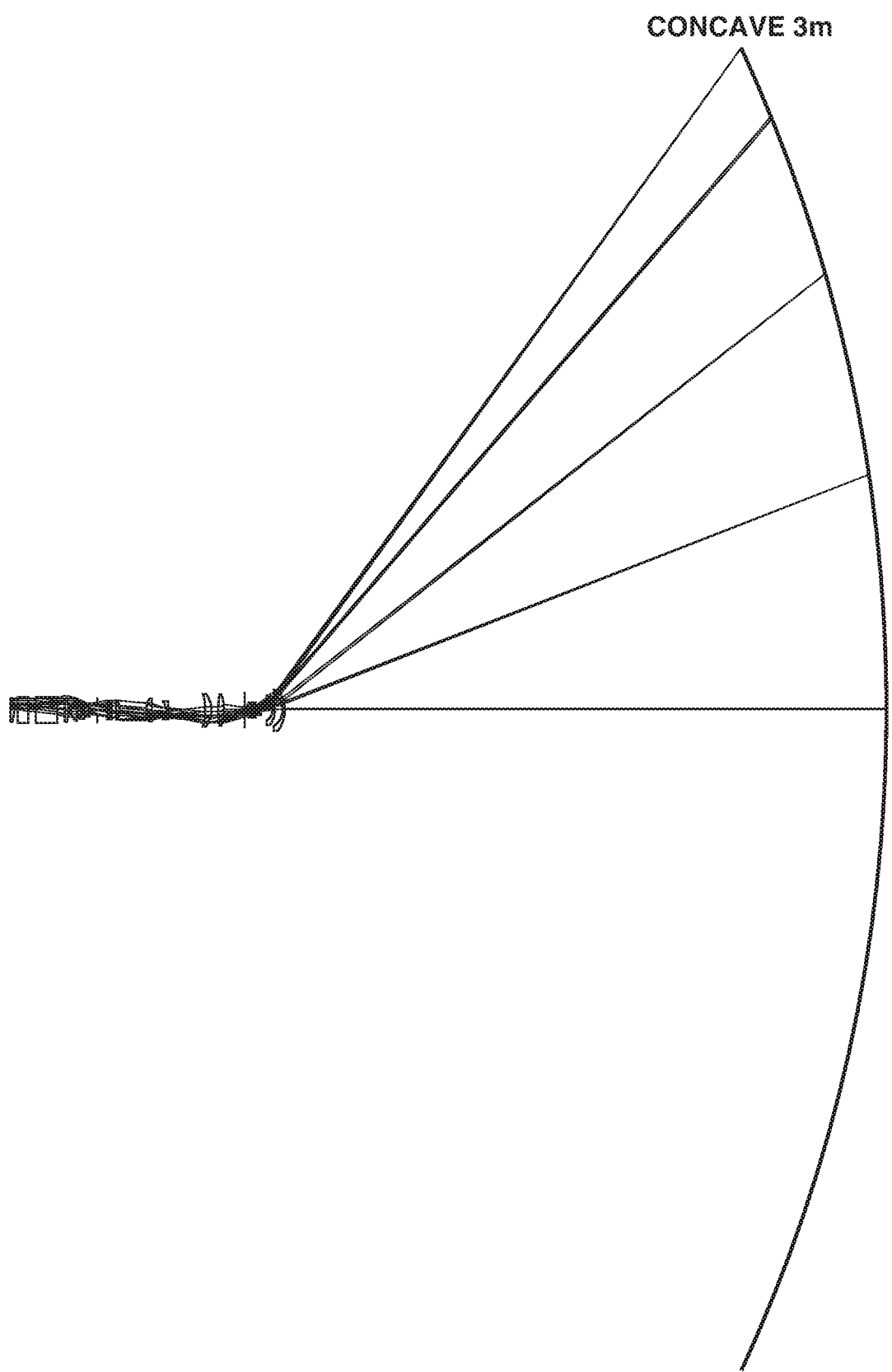
FIG. 2 is a diagram illustrating a state in which an image is projected on a concave curved screen using the projection lens according to the first exemplary embodiment.
Figure 3:
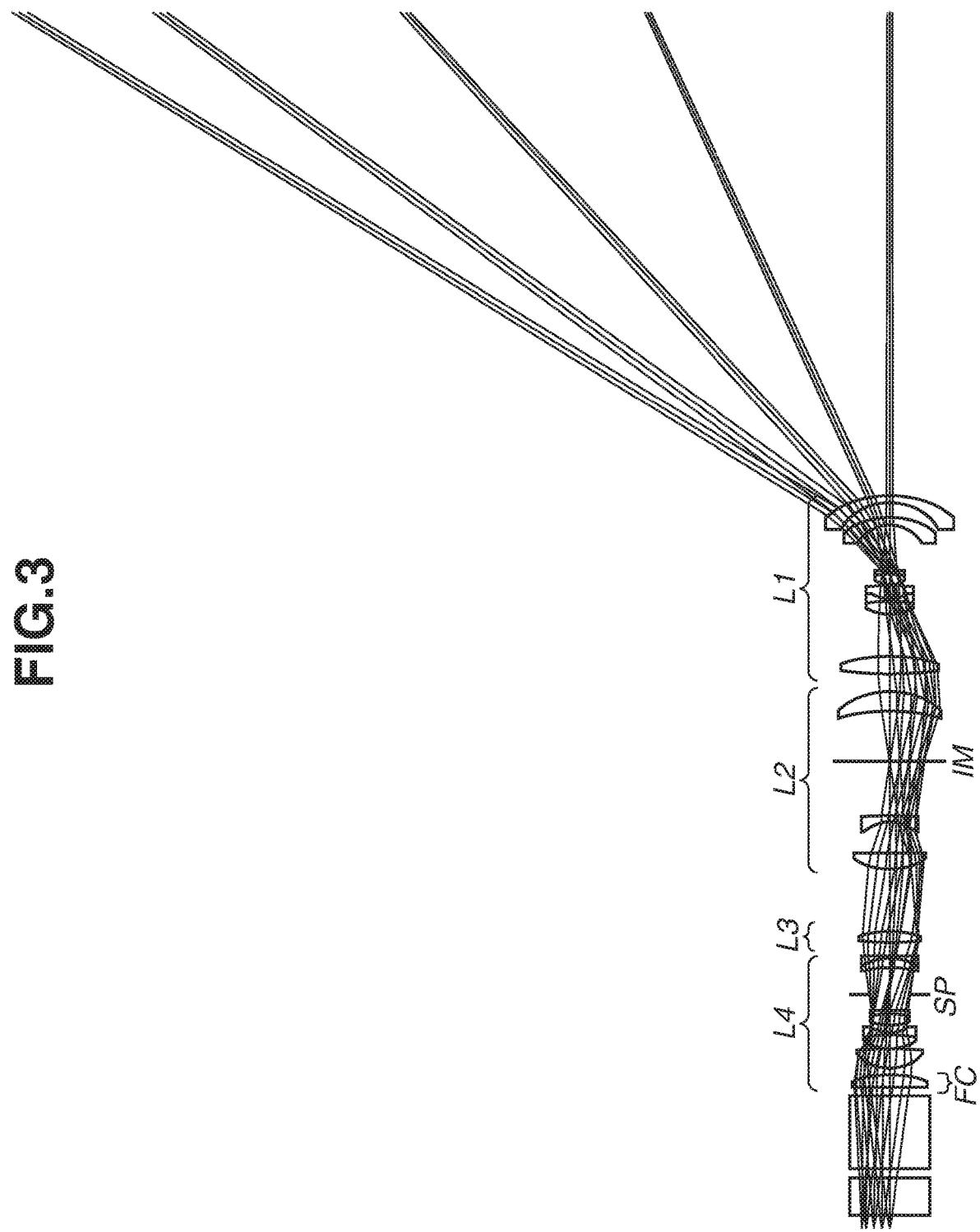
FIG. 3 is an enlarged view illustrating a state in which an image is projected on the concave curved screen using the projection lens according to the first exemplary embodiment.

In the projection lens according to the present exemplary embodiment, as illustrated in FIG. 3, an intermediate image forming surface IM is positioned in the second lens unit L2, and the field curvature adjustment lens unit FC is disposed on the reduction conjugate side with respect to the intermediate image forming surface IM. Although, in FIG. 3, the intermediate image forming surface IM is drawn by a straight line for the convenience, the intermediate image forming surface IM is actually distorted. FIG. 3 is an enlarged view illustrating light of each angle of field and the projection lens illustrated in FIG. 2 in a case where an image is projected on a curved screen concave toward the projection lens side, having a curvature radius of 3 m, by using the projection lens according to the present exemplary embodiment, and focusing and field curvature adjustment are performed.

Figure 5:
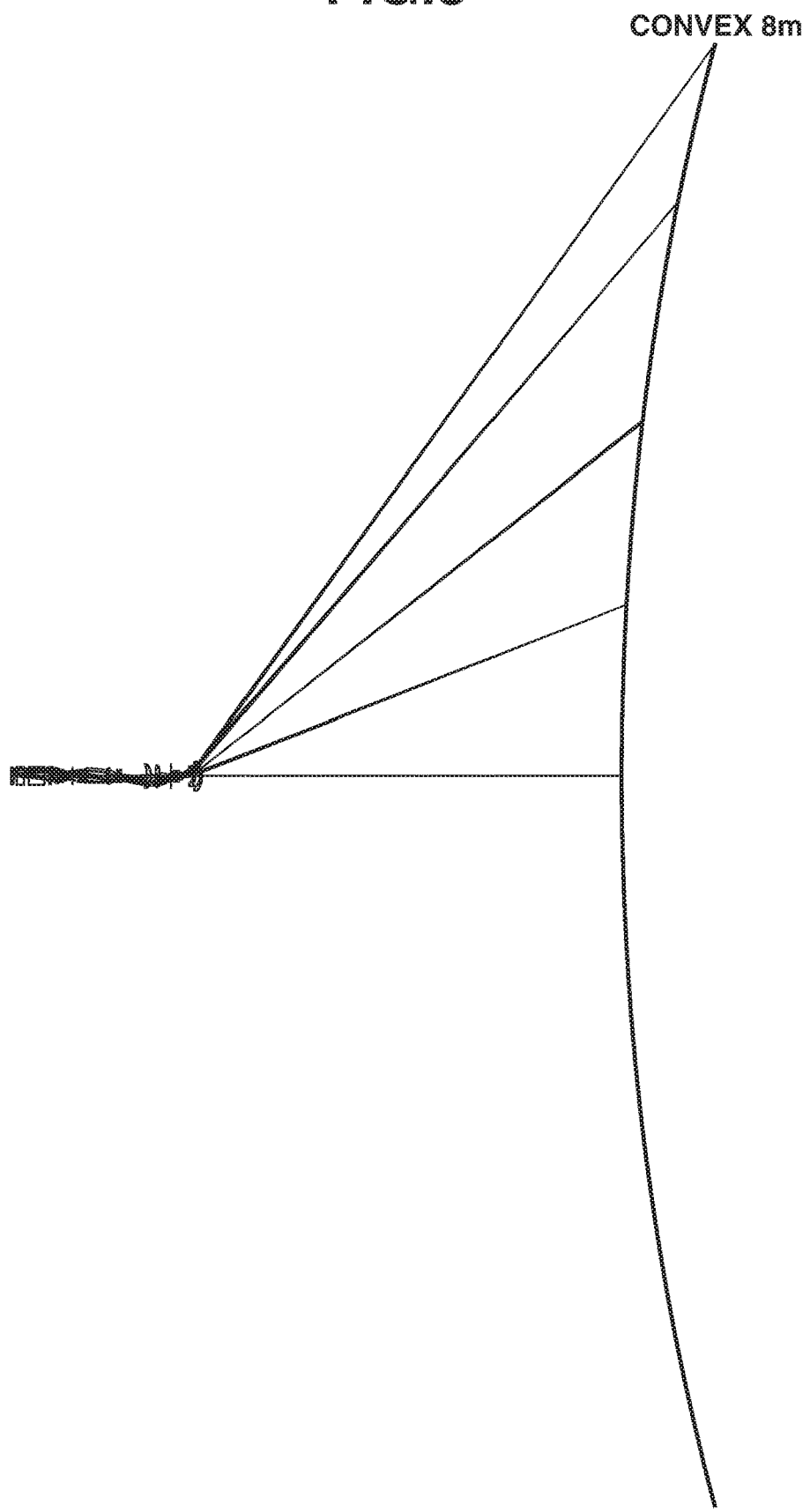
FIG. 5 is a diagram illustrating a state where an image is projected on a convex curved screen using the projection lens according to the first exemplary embodiment.
Figure 9:
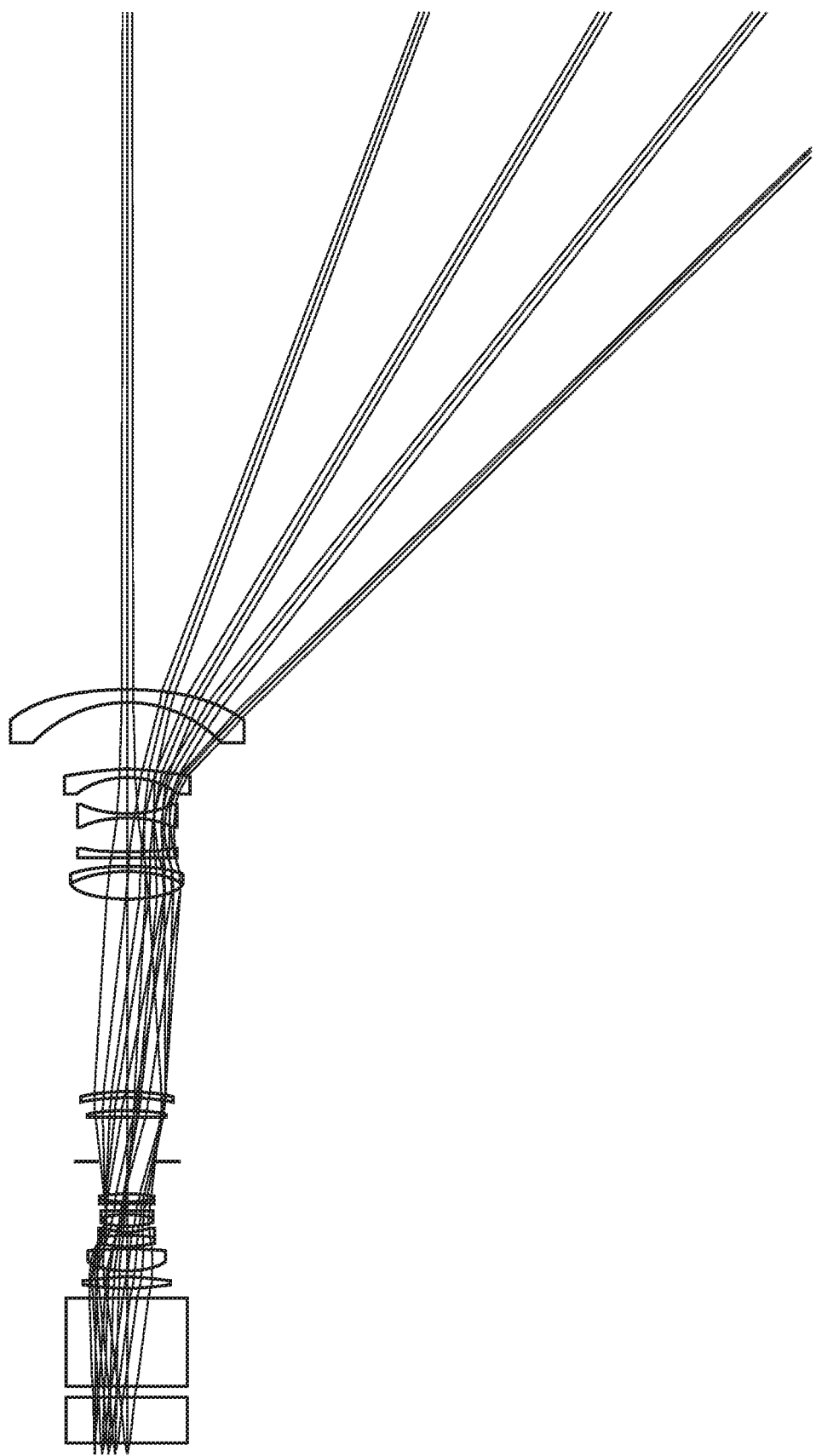
FIG. 9 is an enlarged view illustrating a state in which an image is projected on the concave curved screen using the projection lens according to the second exemplary embodiment.

Referring to FIGS. 1 and 7, the lower side of paper is the enlargement conjugate side, and the upper side of paper is the reduction conjugate side. Referring to FIGS. 2 and 5, the right-hand side of paper is the enlargement conjugate side, and the left-hand side of paper is the reduction conjugate side. Referring to FIGS. 3 and 9, the upper side of paper is the enlargement conjugate side, and the lower side of paper is the reduction conjugate side.

First Numerical Embodiment

The lens data according to the first numerical embodiment corresponding to the projection lens according to the present exemplary embodiment described above will be presented.

In each numerical embodiment, i denotes the order of optical surfaces from the object side, ri denotes the curvature radius of the i-th optical surface (i-th surface), di denotes the interval between the i-th and the (i+1)-th surfaces, ndi and vdi denote the refractive index and the Abbe number of the material of the i-th optical member in the d line, respectively. The back focus (BF) indicates the distance from the final lens surface to the paraxial image plane and is represented by the air conversion length. An asterisk (*) means an aspherical surface.

The Abbe number of optical materials according to the present numerical embodiment and the second numerical embodiment (described below) will be described. The Abbe number vd is given by the following formula (3):

$$\nu d = (nd-1)/(nF-nC) \quad (3)$$

when the refractive indexes in the F-line (486.1 nm), the d-line (587.6 nm), and the C-line (656.3 nm) of Fraunhofer lines are represented by nF, nd, and nC, respectively.

The aspherical shape is represented as follows:

$$x = (h^2/R)/[1+\{1-(1+k)(h/R)^2\}^{1/2}] + A4h^4 + A6h^6 + A8h^8 + A10h^{10}$$

when k denotes the eccentricity, A4, A6, A8, and A10 denote aspherical coefficients, and x denotes the displacement in the optical axis direction at the position with a height h from the optical axis with reference to the surface vertex, where R denotes the paraxial curvature radius.

(Surface data Unit mm)

| Surface number | r | d | nd | vd |
|---|---|---|---|---|
| 1 | 56.355 | 4.00 | 1.67790 | 55.3 |
| 2 | 31.205 | 7.10 | | |
| 3* | 78.564 | 3.50 | 1.58313 | 59.4 |
| 4* | 13.443 | 24.20 | | |
| 5 | −16.798 | 1.50 | 1.84666 | 23.8 |
| 6 | 71.641 | 5.00 | 1.59349 | 67.0 |
| 7 | −13.736 | 0.50 | | |
| 8 | 66.110 | 6.50 | 1.59349 | 67.0 |
| 9 | −18.666 | 1.40 | 1.84666 | 23.8 |
| 10 | 71.418 | 6.50 | 1.59349 | 67.0 |
| 11 | −31.037 | 22.00 | | |
| 12 | 93.205 | 8.50 | 1.80810 | 22.8 |
| 13 | −163.973 | 8.74 | | |
| 14* | 36.283 | 10.00 | 1.90366 | 31.3 |
| 15 | 100.787 | 52.65 | | |
| 16* | 77.693 | 3.00 | 1.58313 | 59.4 |
| 17* | 14.178 | 16.60 | | |
| 18 | −314.339 | 7.50 | 1.83481 | 42.7 |
| 19 | −35.842 | 32.30 | | |
| 20 | 46.341 | 5.50 | 1.48749 | 70.2 |
| 21 | −153.281 | 7.21 | | |
| 22 | 551.642 | 1.50 | 1.48749 | 70.2 |
| 23 | 27.360 | 4.80 | 1.80810 | 22.8 |
| 24 | 69.109 | 12.90 | | |
| 25(Diaphragm) | ∞ | 8.00 | | |
| 26 | −218.122 | 1.50 | 1.84666 | 23.8 |
| 27 | 29.287 | 6.00 | 1.48749 | 70.2 |
| 28 | −27.368 | 3.50 | | |

-continued

| | | | | |
|---|---|---|---|---|
| 29 | −18.484 | 1.50 | 1.90366 | 31.3 |
| 30 | 86.677 | 6.50 | 1.51633 | 64.1 |
| 31 | −28.781 | 0.50 | | |
| 32 | 369.801 | 9.50 | 1.43875 | 94.7 |
| 33 | −25.255 | 3.80 | | |
| 34 | 62.226 | 5.80 | 1.77250 | 49.6 |
| 35 | ∞ | 5.00 | | |
| 36 | ∞ | 37.00 | 1.51633 | 64.1 |
| 37 | ∞ | 4.00 | | |
| 38 | ∞ | 19.50 | 1.80518 | 25.4 |
| 39 | ∞ | 5.80 | | |
| Image plane | ∞ | | | |

(Aspherical surface data)

Third surface

K = 0.00000e+000 A4 = 2.23482e−005 A6 = −2.84117e−008
A8 = 3.84260e−011 A10 = −2.47414e−014
Fourth surface K = −5.84328e−001 A4 = −4.57376e−005 A6 = 1.85652e−007
A8 = −6.68736e−010 A10 = 2.49098e−013
Fourteenth surface K = 0.00000e+000 A4 = −2.80744e−006 A6 = −3.10707e−010
A8 = −1.83015e−012 A10 = 1.45035e−015 A12 = −1.30506e−018
Sixteenth surface K = 0.00000e+000 A4 = −4.24838e−005 A6 = 7.20396e−008
A8 = −1.15539e−010 A10 = 1.40383e−013
Seventeenth surface K = −4.28203e−001 A4 = −8.67428e−005 A6 = 3.23464e−008
A8 = 1.17289e−010 A10 = −8.48144e−013

(Various data)

| | |
|---|---|
| Focal length | 8.51 |
| F number | 2.40 |
| Half angle of field | 59.16 |
| Image height | 14.25 |
| Total lens length | 349.85 |
| BF | 44.85 |

(Lens unit data)

| Unit | Starting surface | Focal length |
|---|---|---|
| 1 | 1 | 25.59 |
| 2 | 14 | 104.61 |
| 3 | 20 | 73.44 |
| 4 | 22 | 60.29 |

Figure 4:
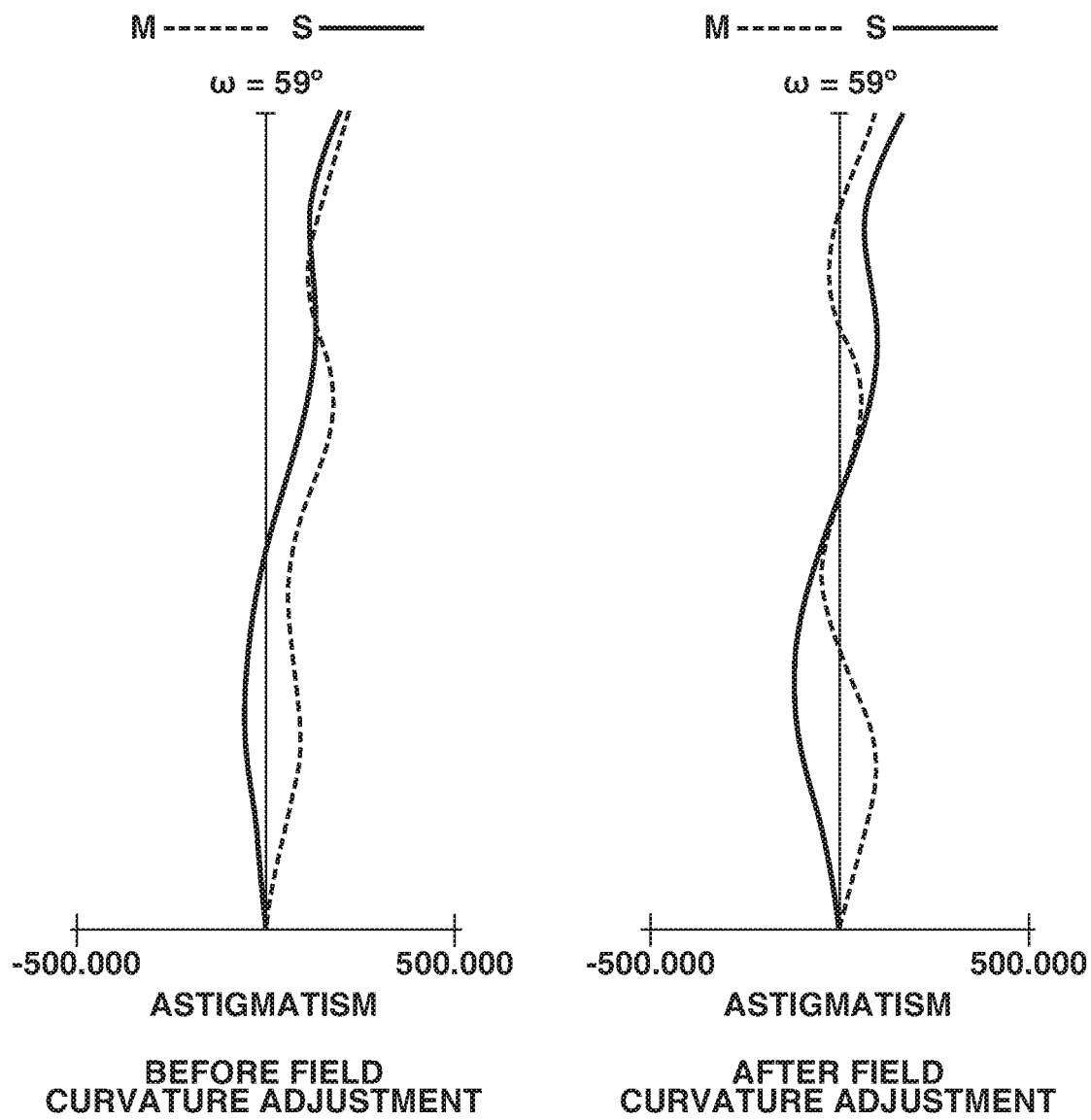
FIG. 4 is a diagram illustrating astigmatism in a case where an image is projected on the concave curved screen using the projection lens according to the first exemplary embodiment.
Figure 6:
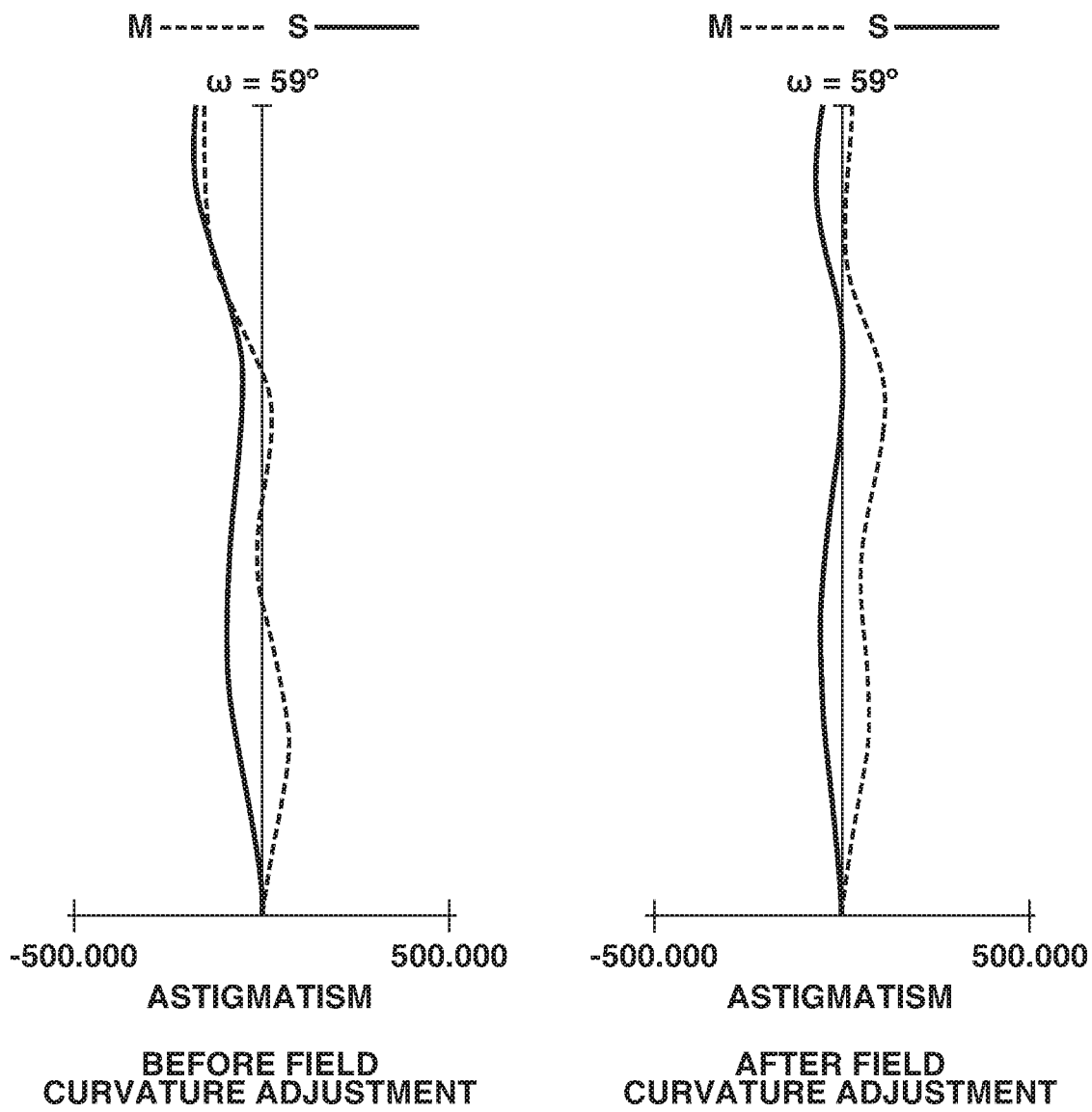
FIG. 6 is a diagram illustrating astigmatism in a case where an image is projected on the convex curved screen using the projection lens according to the first exemplary embodiment.

FIG. 4 is a diagram illustrating astigmatism in the case of FIGS. 2 and 3, and FIG. 6 is a diagram illustrating astigmatism in the case of FIG. 5. FIG. 5 is a diagram illustrating light of each angle of field and the projection lens in a case where an image is projected on a curved screen convex toward the projection lens side, having a curvature radius of 8 m, by using the projection lens according to the present exemplary embodiment, and focusing and field curvature adjustment are performed. Referring to FIGS. 4 and 6, the solid lines indicate astigmatism of light with a wavelength of 550 nm on a sagittal image plane, and the dotted lines illustrate astigmatism of light with a wavelength of 550 nm on a meridional image plane. The half angle of field is denoted by w and w is at 59 degrees in FIGS. 4 and 6. As illustrated in FIGS. 4 and 6, the projection lens according to the present exemplary embodiment can improve astigmatism in comparison between before and after the field curvature adjustment.

A projection lens (image forming optical system) according to the second exemplary embodiment will be described below with reference to FIGS. 7 to 12.

(Overall Configuration of Projection Lens)

FIG. 7 illustrates a lens configuration of the projection lens according to the present exemplary embodiment. The projection lens according to the present exemplary embodiment is a zoom lens which includes a first lens unit L1 to a seventh lens unit L7 as a plurality of lens units and a diaphragm SP. The diaphragm SP is disposed more towards the enlargement conjugate side than the seventh lens unit L7. More specifically, the diaphragm SP is disposed between the third lens unit L3 and the fourth lens unit L4.

The first lens unit L1 to the seventh lens unit L7 are disposed in such a manner that intervals between adjacent lens units change in zooming. More specifically, the first lens unit L1 and the seventh lens unit L7 do not move in zooming. In zooming from the wide-angle end to the telephoto end, the second lens unit L2 to the sixth lens unit L6 and the diaphragm SP move to the enlargement conjugate side in the optical axis direction of the projection lens along loci different from each other. Boundaries between a plurality of lens units can also be defined as the intervals between lenses which change in zooming.

The first lens unit L1 includes a plurality of sub-lens units configured in such a manner that the intervals between adjacent sub-lens units change in focusing. According to the present exemplary embodiment, the plurality of sub-lens units includes the first sub-lens unit SL1, the second sub-lens unit SL2, and the third sub-lens unit SL3. In focusing, the second sub-lens unit SL2 and third sub-lens unit SL3 move in the optical axis direction of the projection lens. More specifically, the first sub-lens unit SL1 does not move in focusing. In focusing from infinity to a close distance, the second sub-lens unit SL2 and the third sub-lens unit SL3 move to the reduction conjugate side along loci different from each other. With this configuration, variation of the field curvature in focusing can be reduced. The second lens unit L2 to the seventh lens unit L7 do not move in focusing.

The seventh lens unit L7 includes the field curvature adjustment lens unit FC.

(Configuration of Each Lens Unit)

The first lens unit L1 includes four lenses and one cemented lens. More specifically, the first sub-lens unit SL1 includes three lenses, the second sub-lens unit SL2 includes one negative lens, and the third sub-lens unit SL3 includes one cemented lens. The first and the second lenses from the enlargement conjugate side from among the lenses included in the first lens unit L1 are aspherical lenses. These aspherical lenses are provided with an effect of correcting the field curvature and distortion.

Each of the second lens unit L2 and the third lens unit L3 includes one lens. Each of the fourth lens unit L4 and the fifth lens unit L5 includes one cemented lens. With this configuration, the axial chromatic aberration in the entire zoom range can be favorably corrected.

The sixth lens unit L6 includes one cemented lens and one lens. The seventh lens unit L7 includes one lens.

According to the present exemplary embodiment, the diaphragm SP moves in the optical axis direction of the projection lens along a locus different from the loci of the lens units in zooming. The aperture diameter of the diaphragm SP is constant in zooming. However, the diaphragm SP may be integrated with the third lens unit L3 or the fourth lens unit L4. Further, by making the aperture diameter of the diaphragm SP variable, ghost and flare by unnecessary light may be eliminated to improve the contrast of a projection image.

(Configuration for Adjusting Amount of Field Curvature)

According to the present exemplary embodiment, similarly to the above-described first exemplary embodiment, the final lens unit includes the field curvature adjustment lens unit FC to adjust the amount of field curvature with a configuration similar to the first exemplary embodiment. According to the present exemplary embodiment, the final lens unit is the seventh lens unit L7. Therefore, according to the present exemplary embodiment, a similar effect obtained by the first exemplary embodiment can be obtained. A more desirable configuration, for example, a configuration different from the projection lens according to the first exemplary embodiment, may be applied to the present exemplary embodiment.

Second Numerical Embodiment

The lens data according to the second numerical embodiment corresponding to the above-described projection lens according to the present exemplary embodiment is as follows.

| (Surface data Unit mm) | | | | |
|---|---|---|---|---|
| Surface number | r | d | nd | vd |
| 1* | 330.256 | 5.00 | 1.65160 | 58.5 |
| 2 | 55.262 | 27.84 | | |
| 3* | 84.396 | 3.00 | 1.83481 | 42.7 |
| 4 | 36.392 | 15.53 | | |
| 5 | −58.066 | 2.00 | 1.43875 | 94.7 |
| 6 | 49.389 | 14.43 | | |
| 7 | −112.104 | 2.00 | 1.77250 | 49.6 |
| 8 | 554.177 | 4.00 | | |
| 9 | 95.914 | 2.30 | 1.92286 | 20.9 |
| 10 | 59.911 | 11.71 | 1.60342 | 38.0 |
| 11 | −52.551 | (Variable) | | |
| 12 | 71.750 | 2.75 | 1.58913 | 61.1 |
| 13 | 139.420 | (Variable) | | |
| 14 | 82.451 | 2.78 | 1.80518 | 25.5 |
| 15 | 727.084 | (Variable) | | |
| 16 (Diaphragm) | ∞ | (Variable) | | |
| 17 | 97.753 | 3.33 | 1.51633 | 64.1 |
| 18 | −56.305 | 1.30 | 1.90366 | 31.3 |
| 19 | −110.664 | (Variable) | | |
| 20 | −161.174 | 1.20 | 1.90366 | 31.3 |
| 21 | 29.682 | 4.90 | 1.51633 | 64.1 |
| 22 | −53.464 | (Variable) | | |
| 23 | −26.413 | 1.30 | 1.90366 | 31.3 |
| 24 | 86.880 | 4.70 | 1.51633 | 64.1 |
| 25 | −40.873 | 1.00 | | |
| 26 | 195.670 | 9.13 | 1.49700 | 81.5 |
| 27 | −31.111 | (Variable) | | |
| 28 | 101.853 | 4.34 | 1.80810 | 22.8 |
| 29 | −167.363 | 5.00 | | |
| 30 | ∞ | 37.00 | 1.51633 | 64.1 |
| 31 | ∞ | 4.00 | | |
| 32 | ∞ | 19.50 | 1.80518 | 25.4 |
| 33 | ∞ | 5.80 | | |
| Image plane | ∞ | | | |

| (Aspherical surface data) |
|---|
| First surface |

K = 0.00000e+000 A4 = 2.45572e−006 A6 = −1.02519e−009
A8 = 5.16476e−013 A10 = −1.44875e−016 A12 = 2.07693e−020

Third surface

K = 0.00000e+000 A4 = −3.54628e−006 A6 = 1.89251e−009
A8 = −2.53514e−012 A10 = 2.52440e−015 A12 = −9.46913e−019

-continued (Various data)
Zoom ratio 1.30

| | Wide angle | Intermediate | Telephoto |
|---|---|---|---|
| Focal length | 13.31 | 15.45 | 17.29 |
| F number | 2.57 | 2.60 | 2.60 |
| Half angle of field | 45.50 | 41.23 | 38.07 |
| Image height | 13.54 | 13.54 | 13.54 |
| Total lens length | 298.43 | 298.41 | 298.40 |
| BF | 49.82 | 49.80 | 49.79 |
| d11 | 79.56 | 60.00 | 42.94 |
| d13 | 4.98 | 11.93 | 20.62 |
| d15 | 19.11 | 25.81 | 32.01 |
| d16 | 12.89 | 9.39 | 3.87 |
| d19 | 2.50 | 2.54 | 4.57 |
| d22 | 3.01 | 3.48 | 2.20 |
| d27 | 2.00 | 10.91 | 17.84 |

(Lens unit data)

| Unit | Starting surface | Focal length |
|---|---|---|
| 1 | 1 | −41.93 |
| 2 | 12 | 246.33 |
| 3 | 14 | 114.33 |
| 4 | 17 | 152.49 |
| 5 | 20 | −116.63 |
| 6 | 23 | −1336.63 |
| 7 | 28 | 78.21 |

(Sub-lens unit data)

| Unit | Starting surface | Focal length |
|---|---|---|
| 1 | 1 | −18.42 |
| 2 | 7 | −120.03 |
| 3 | 9 | 64.95 |

Figure 8:
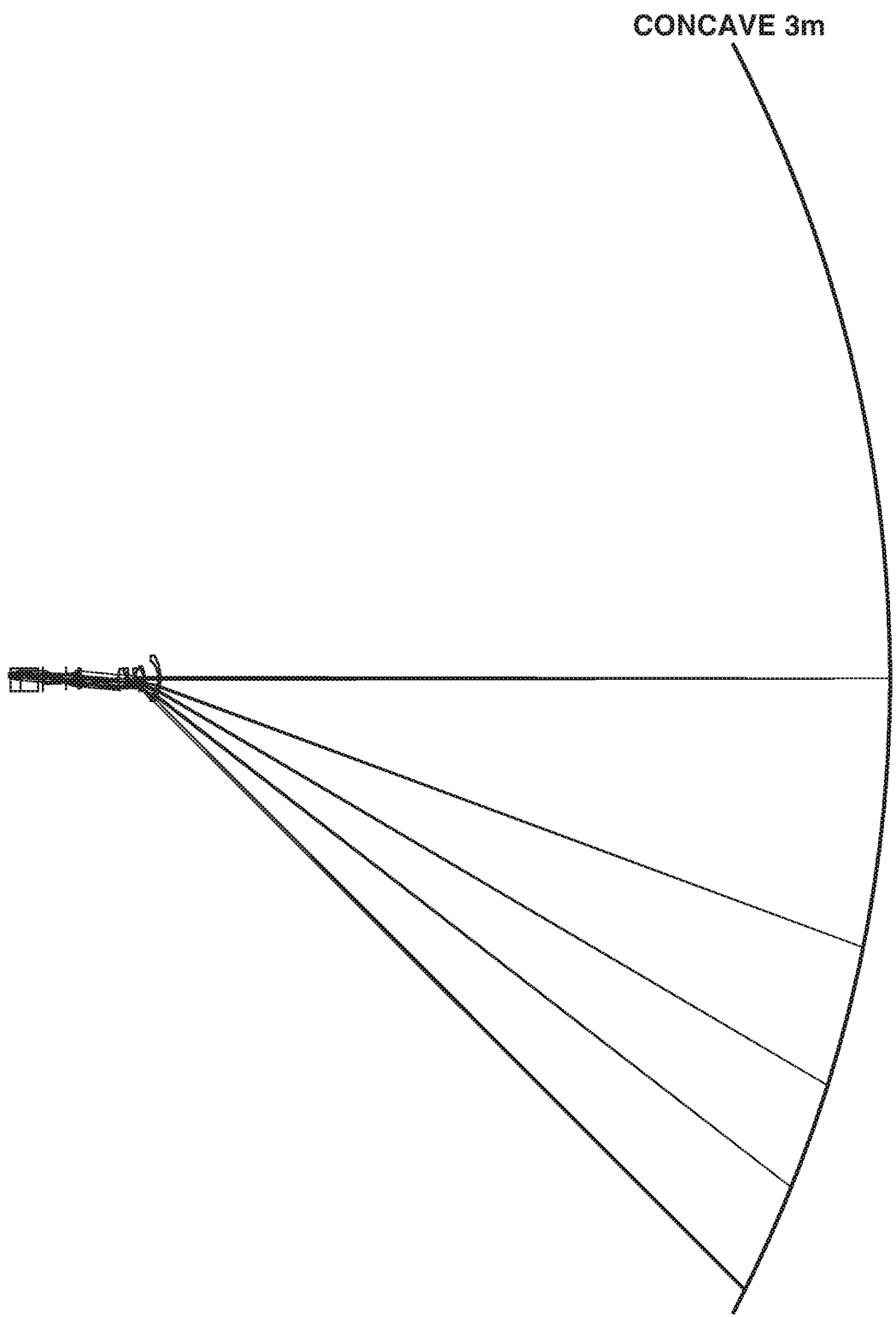
FIG. 8 is a diagram illustrating a state where an image is projected on the concave curved screen using the projection lens according to the second exemplary embodiment.
Figure 10:
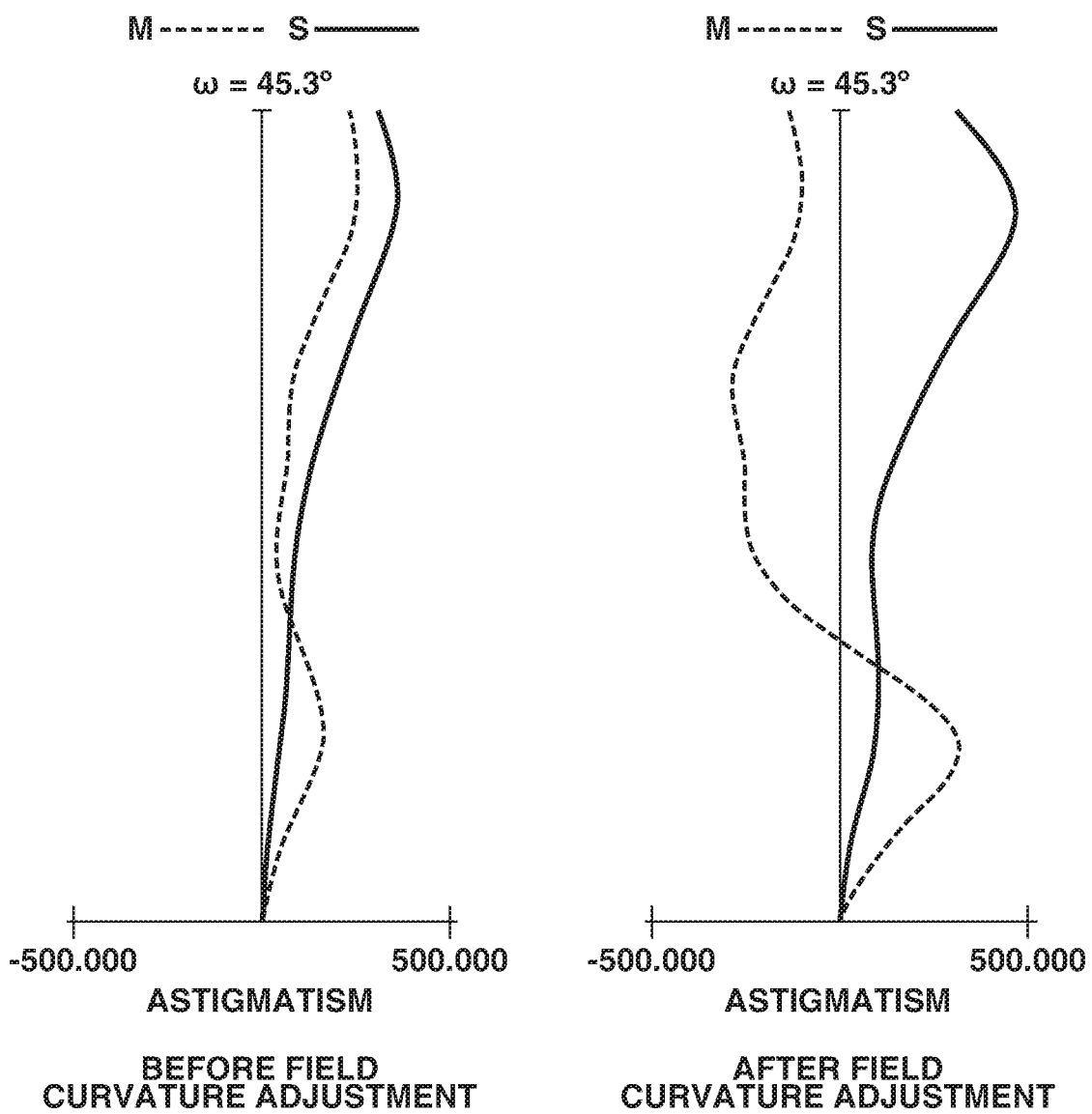
FIG. 10 is a diagram illustrating astigmatism in a case where an image is projected on the concave curved screen using the projection lens according to the second exemplary embodiment.
Figure 11:
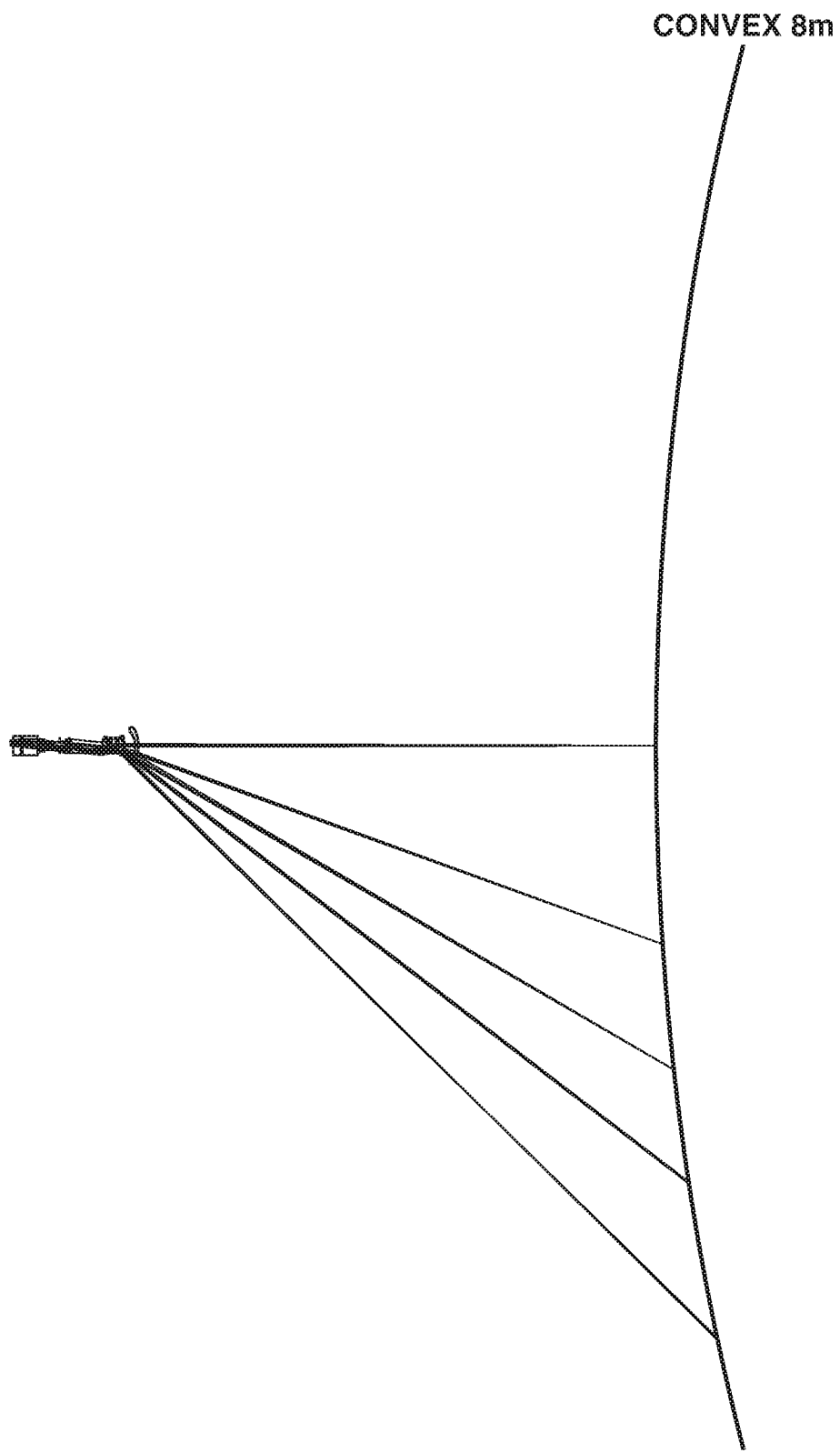
FIG. 11 is a diagram illustrating a state where an image is projected on the convex curved screen using the projection lens according to the second exemplary embodiment.
Figure 12:
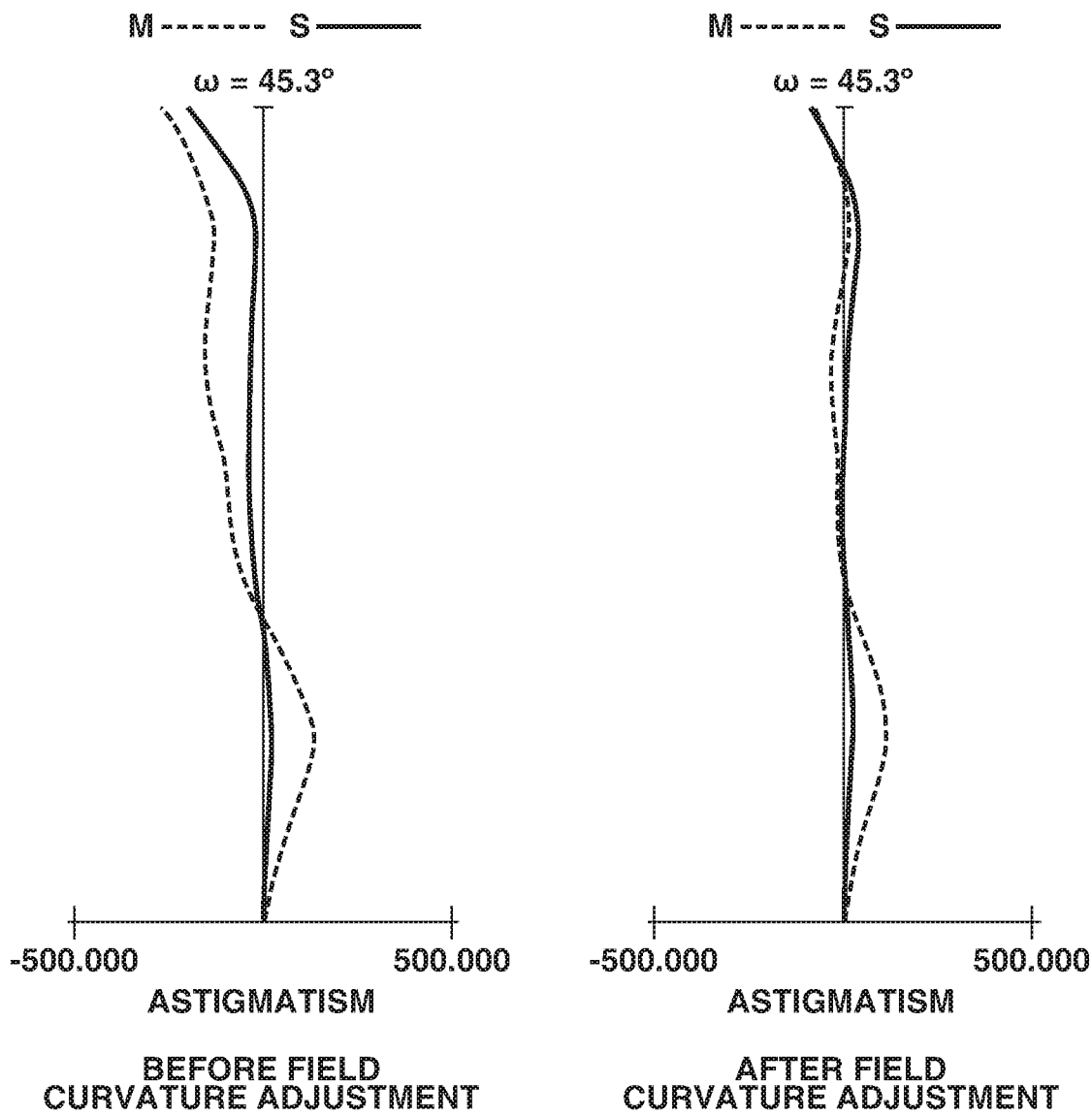
FIG. 12 is a diagram illustrating astigmatism in a case where an image is projected on the convex curved screen using the projection lens according to the second exemplary embodiment.

FIG. 10 is a diagram illustrating astigmatism in the case of FIGS. 8 and 9, and FIG. 12 is a diagram illustrating astigmatism in the case of FIG. 11. FIG. 8 illustrates light of each angle of field and the projection lens in a case where an image is projected on a curved screen concave toward the projection lens side, having a curvature radius of 3 m, by using the projection lens according to the present exemplary embodiment, and focusing and field curvature adjustment are performed. FIG. 9 is an enlarged view illustrating the projection lens illustrated in FIG. 8. FIG. 11 is a diagram illustrating light of each angle of field and the projection lens in a case where an image is projected on a curved screen convex toward the projection lens side, having a curvature radius of 8 m, by using the projection lens according to the present exemplary embodiment, and focusing and field curvature adjustment are performed. Referring to FIGS. 8 and 11, the focal length of the projection lens is the focal length at the wide-angle end.

Referring to FIGS. 10 and 12, the solid lines indicate astigmatism of light with a wavelength of 550 nm on a sagittal image plane, and the dotted lines indicate astigmatism of light with a wavelength of 550 nm on a meridional image plane. The half angle of field is denoted by w and w is at 45.3 degrees in FIGS. 10 and 12. As illustrated in FIGS. 10 and 12, the projection lens according to the present exemplary embodiment can improve astigmatism in comparison between before and after the field curvature adjustment.

Table 1 illustrates results of calculations by the conditional formulas (1) and (2) according to the first and the second exemplary embodiments.

TABLE 1

| | First exemplary embodiment | Second exemplary embodiment |
|---|---|---|
| Conditional formula (1) fc/f | 9.43 | 5.88 |
| Conditional formula (2) |ff/fc| | 9.09 | 1.51 |
| Focal length of entire system (f) | 8.51 | 13.31 |
| Focal length of field curvature adjustment lens unit FC (fc) | 80.21 | 78.21 |
| Focal length of focus lens unit (ff) | −728.85 | 118.13 |

While the present invention has specifically been described based on the above-described preferred exemplary embodiments, the present invention is not limited thereto but can be modified in diverse ways within the ambit of the appended claims.

For example, the exemplary embodiments have been described centering on a configuration of a projection lens as an image forming optical system, the configurations of the exemplary embodiments may be applied to an imaging optical system for camera as an image forming optical system.

When the amount of field curvature is adjusted, both the field curvature adjustment lens unit FC and the focus lens units are moved in the optical axis direction of the image forming optical system. More specifically, as described above, when the amount of field curvature is adjusted, the field curvature adjustment lens unit FC and the focus lens units may simultaneously or alternately move in the optical axis direction. Further, when the amount of field curvature is adjusted, the focus lens units may move in the optical axis direction after the field curvature adjustment lens unit FC moves in the optical axis direction.

In the image forming optical system, the above-described exemplary embodiments focuses on the field curvature adjustment lens unit FC disposed more towards the reduction conjugate side than the diaphragm. However, the following configuration out of the configurations of the image forming optical systems according to the first exemplary embodiment may be focused. More specifically, in an image forming optical system of intermediate image forming type, the amount of field curvature is adjusted by moving in the optical axis direction at least one of a plurality of lenses included in a lens unit different from the focus lens unit.

Figure 14A:
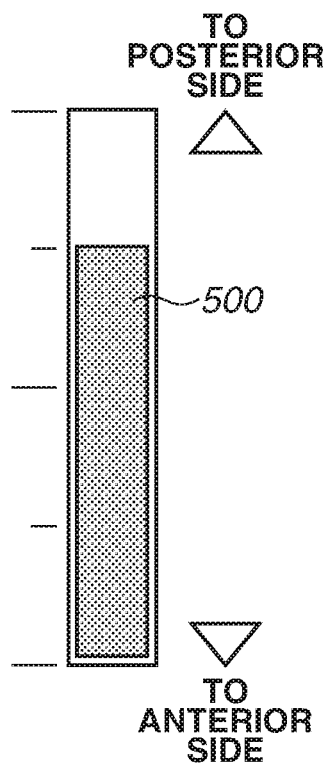
FIGS. 14A and 14B are diagrams illustrating graphical user interfaces (GUIs) for adjusting the field curvature.
Figure 14B:
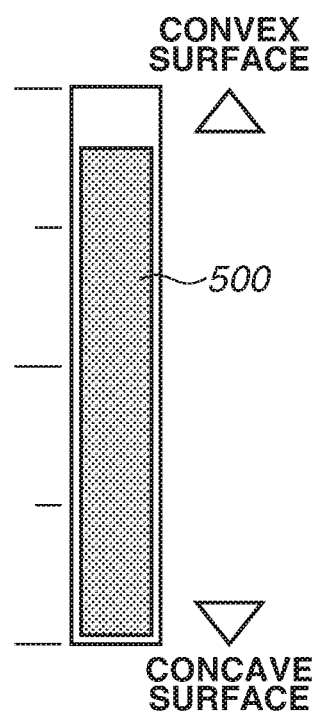

A description will be given of graphical user interfaces (GUIs) displayed on a screen to enable the user to perform field curvature adjustment on the projector illustrated in FIG. 13, with reference to FIGS. 14A and 14B. FIG. 14A is a diagram illustrating a GUI displayed when regular focusing (a focusing operation for focusing the screen center) is performed.

The user operates an operation unit, such as a cross key, disposed on a remote control or projector (not illustrated) in the vertical (or horizontal) direction. Then, an actuator in the projector for moving the focus lens units in the optical axis direction is driven. As a result, the focus lens units move in association with a cross key operation by the user, and focusing is performed. In this process, the upper end of a slider bar 500 on paper in the GUI illustrated in FIG. 14A vertically moves in association with the cross key operation by the user.

The GUI illustrated in FIG. 14B will be described below. When the user operates the cross key in the vertical (or horizontal) direction, the actuator in the projector for moving the field curvature adjustment lens unit FC in the optical axis direction is driven. As a result, the field curvature adjustment lens unit FC moves in association with a cross key operation by the user, and the adjustment of the amount of field curvature is performed. In this case, similarly to the GUI illustrated in FIG. 14A, the upper end of the slider bar 500 on paper in the GUI illustrated in FIG. 14B vertically moves in association with the cross key operation by the user.

Instead of a cross key disposed on a remote control or projector, an electronic cross key displayed on the screen of a portable terminal such as a smart phone may also be used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2018-013036, filed Jan. 29, 2018, and No. 2018-101007, filed May 25, 2018, which are hereby incorporated by reference herein in their entirety.

What is claimed is:

1. A projection lens comprising:
a plurality of lens units; and
a diaphragm,
wherein the plurality of lens units are configured in such a manner that intervals between adjacent lens units change during zooming or focusing,
wherein a focus lens unit among the plurality of lens units is configured to move in an optical axis direction of the projection lens during the focusing,
wherein at least one lens included in a lens unit that is different from the focus lens unit among the plurality of lens units is disposed more towards a reduction conjugate side than the diaphragm,
wherein when an amount of field curvature is adjusted to a shape of a curved projection surface, both the at least one lens and the focus lens unit are configured to move in the optical axis direction, and
wherein the at least one lens is one lens or one pair of lenses disposed on the most reduction conjugate side, among the plurality of lenses included in the projection lens.

2. The projection lens according to claim 1, wherein when the amount of field curvature is adjusted, the at least one lens and the focus lens unit are configured to move simultaneously in the optical axis direction.

3. The projection lens according to claim 1, wherein when the amount of field curvature is adjusted, the focus lens unit moves in the optical axis direction after the at least one lens moves in the optical axis direction.

4. The projection lens according to claim 1, wherein when the amount of field curvature is adjusted, the at least one lens and the focus lens unit are configured to move alternately in the optical axis direction.

5. The projection lens according to claim 1, wherein the following formula is satisfied:

$$4.0 \leq fc/f \leq 10.0$$

when the at least one lens has a focal length fc and the image forming optical system has a focal length f.

6. The projection lens according to claim 5, wherein the following formula is satisfied:

$$4.5 \leq fc/f \leq 9.6.$$

7. The projection lens according to claim 1, wherein the following formula is satisfied:

$$1.0 \leq |ff/fc| \leq 12.0$$

when the at least one lens has a focal length fc and the focus lens unit has a focal length ff.

8. The projection lens according to claim 7, wherein the following formula is satisfied:

$$1.3 \leq |ff/fc| \leq 10.0.$$

9. The projection lens according to claim 1,
wherein the plurality of lens units includes:
a first lens unit;
a second lens unit;
a third lens unit; and
a fourth lens unit,
arranged from an enlargement conjugate side to the reduction conjugate side,
wherein the first, the second, the third, and the fourth lens units are configured in such a manner that that intervals between adjacent lens units change during focusing,
wherein the first and the fourth lens units do not move during focusing,
wherein the second and the third lens units are the focus lens units that move in the optical axis direction during focusing, and
wherein the diaphragm and the at least one lens are included in the fourth lens unit.

10. The projection lens according to claim 9, wherein when focusing is performed from infinity to a close distance, the second lens unit moves to the reduction conjugate side, and the third lens unit moves to the enlargement conjugate side.

11. The projection lens according claim 1,
wherein the plurality of lens units includes:
a first lens unit;
a second lens unit;
a third lens unit;
a fourth lens unit;
a fifth lens unit;
a sixth lens unit; and
a seventh lens unit,
arranged from an enlargement conjugate side to the reduction conjugate side,
wherein the first, the second, the third, the fourth, the fifth, the sixth, and the seventh lens units are configured in such a manner that intervals between adjacent lens units change during zooming,
wherein the first and the seventh lens units do not move during zooming,
wherein the second, the third, the fourth, the fifth, and the sixth lens units move in the optical axis direction during zooming, and
wherein the at least one lens is included in the seventh lens unit.

12. The projection lens according to claim 11, wherein the diaphragm is disposed more towards the enlargement conjugate side than the seventh lens unit.

13. The projection lens according to claim 11, wherein, in zooming from a wide-angle end to a telephoto end, the second, the third, the fourth, the fifth, and the sixth lens units are configured to move to the enlargement conjugate side.

14. The projection lens according to claim 11,
wherein the first lens unit includes a first sub-lens unit, a second sub-lens unit, and a third sub-lens unit which are configured in such a manner that intervals between adjacent sub-lens units change during focusing, and wherein the second and the third sub-lens units are the focus lens units that move in the optical axis direction during focusing.

15. The projection lens according to claim 14, wherein the first sub-lens unit is configured not to move during focusing, and
wherein during focusing from infinity to a close distance, the second and the third sub-lens units are configured to move to the reduction conjugate side.

16. The projection lens according to claim 1, wherein the at least one lens has positive power.

17. The projection lens according to claim 1, wherein the projection lens is configured in such a manner that an enlargement conjugate surface and an intermediate image forming surface disposed inside the projection lens are conjugated, and the intermediate image forming surface and a reduction conjugate surface are conjugated.

18. The projection lens according to claim 1, wherein the at least one lens is configured not to move during focusing.

19. The projection lens according to claim 1, wherein the at least one lens is configured not to move during zooming.

20. A projection lens comprising:
a plurality of lens units,
wherein the plurality of lens units are configured in such a manner that intervals between adjacent lens units change during zooming or focusing,
wherein the projection lens is configured in such a manner that an enlargement conjugate surface and an intermediate image forming surface disposed inside the projection lens are conjugated, and the intermediate image forming surface and a reduction conjugate surface are conjugated,
wherein in a case where a lens unit that moves in an optical axis direction of the projection lens during the focusing serves as a focus lens unit among the plurality of lens units, at least one lens included in a lens unit different from the focus lens unit, among the plurality of lens units, is configured to move in the optical axis direction when an amount of field curvature is adjusted to focus on a curved projection surface,
wherein the at least one lens is one lens or one pair of lenses disposed on the most reduction conjugate side, among the plurality of lenses included in the projection lens.

21. A projection display apparatus comprising:
a light source;
a light modulation element;
a projection lens; and
a light guide optical system configured to guide light from the light source to the light modulation element and to guide the light from the light modulation element to the projection lens,
wherein the projection lens includes:
a plurality of lens units; and
a diaphragm,
wherein the plurality of lens units are configured in such a manner that intervals between adjacent lens units change during zooming or focusing,
wherein a focus lens unit among the plurality of lens unit is configured to move in an optical axis direction of the projection lens during the focusing,
wherein at least one lens included in a lens unit that is different from the focus lens unit among the plurality of lens units is disposed more towards a reduction conjugate side than the diaphragm,
wherein when an amount of field curvature is adjusted to a shape of a curved projection surface, both the at least one lens and the focus lens unit are configured to move in the optical axis direction, and
wherein the at least one lens is one lens or one pair of lenses disposed on the most reduction conjugate side, among the plurality of lenses included in the projection lens.

22. A projection display apparatus comprising:
a light source;
a light modulation element;
a projection lens; and
a light guide optical system configured to guide light from the light source to the light modulation element and to guide the light from the light modulation element to the projection lens,
wherein the projection lens includes:
a plurality of lens units,
wherein the plurality of lens units are configured in such a manner that intervals between adjacent lens units change during zooming or focusing,
wherein the projection lens is configured in such a manner that an enlargement conjugate surface and an intermediate image forming surface disposed inside the projection lens are conjugated, and the intermediate image forming surface and a reduction conjugate surface are conjugated,
wherein in a case where a lens unit that moves in an optical axis direction of the projection lens during focusing serves as a focus lens unit among the plurality of lens units, at least one lens included in a lens unit that is different from the focus lens unit among the plurality of lens units is configured to move in the optical axis direction when an amount of field curvature is adjusted to a shape of a curved projection surface, and
wherein the at least one lens is one lens or one pair lens disposed on the most reduction conjugate side, among the plurality of lenses included in the projection lens.

* * * * *